(12) United States Patent
Baldwin

(10) Patent No.: US 6,619,441 B2
(45) Date of Patent: Sep. 16, 2003

(54) CONICAL BRAKE ASSEMBLY

(75) Inventor: Steven Baldwin, Troy, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/921,418

(22) Filed: Aug. 2, 2001

(65) Prior Publication Data

US 2003/0024778 A1 Feb. 6, 2003

(51) Int. Cl.[7] ............................................. F16D 51/00
(52) U.S. Cl. .................... 188/70 R; 188/73.2; 188/72.7; 188/216; 188/1.11 L; 188/196 R; 188/78; 188/79.51; 188/71.8
(58) Field of Search ................................. 188/17, 18 R, 188/70 R, 70 B, 72.1, 72.7, 72.8, 1.11 L, 1.11 E, 250 B, 73.1, 78, 73.2, 71.8–71.9, 79.51–75.64, 106 F, 106 P, 156–165, 84, 80, 67, 72.4, 26, 196, 72.3, 216, 79, 250, 323, 366–370; 192/66.2, 66.22, 66.23, 70.15; 310/77; 475/235; 74/491

(56) References Cited

U.S. PATENT DOCUMENTS

| | | | | |
|---|---|---|---|---|
| 1,931,901 A | * | 10/1933 | O'Brien | |
| 1,932,998 A | * | 10/1933 | Wood | |
| 2,047,556 A | * | 7/1936 | Harvey | |
| 2,107,091 A | * | 2/1938 | Swennes | |
| 3,268,035 A | * | 8/1966 | Wagner | |
| 3,498,417 A | * | 3/1970 | Schmid | |
| 3,584,710 A | * | 6/1971 | Frohlich | 188/216 |
| 3,822,768 A | * | 7/1974 | Sebulke | 188/70 R |
| 4,030,576 A | * | 6/1977 | Pringle | 188/71.8 |
| 4,114,732 A | * | 9/1978 | Dunn | 188/73.2 |
| 4,566,575 A | * | 1/1986 | Sekella | |
| 5,203,434 A | * | 4/1993 | Teeter et al. | 188/70 R |
| 5,410,293 A | * | 4/1995 | Angerfors | |
| 2001/0035012 A1 | * | 11/2001 | Smith | |

FOREIGN PATENT DOCUMENTS

| | | | |
|---|---|---|---|
| DE | 2854452 | * | 6/1980 |
| DE | 3247008 | * | 6/1984 |
| EP | 1 149 721 A2 | | 10/2001 |
| JP | 58-42840 | * | 3/1983 |

OTHER PUBLICATIONS

Translation of DE 3247008.*
Translation of DE 2854452.*

* cited by examiner

*Primary Examiner*—Douglas C. Butler
(74) *Attorney, Agent, or Firm*—Carlson, Gaskey & Olds

(57) ABSTRACT

A brake assembly utilizes a conical brake drum and matching conical brake lining assembly to provide a more efficient braking system. An adjuster mechanism with a pair of conical adjuster members is controlled by an electric motor and worm gear drive. As the lining wears, the adjuster mechanism pulls the conical adjuster members towards one another to force the brake linings outwardly to maintain a predetermined distance between the drum and the brake lining assembly.

37 Claims, 2 Drawing Sheets

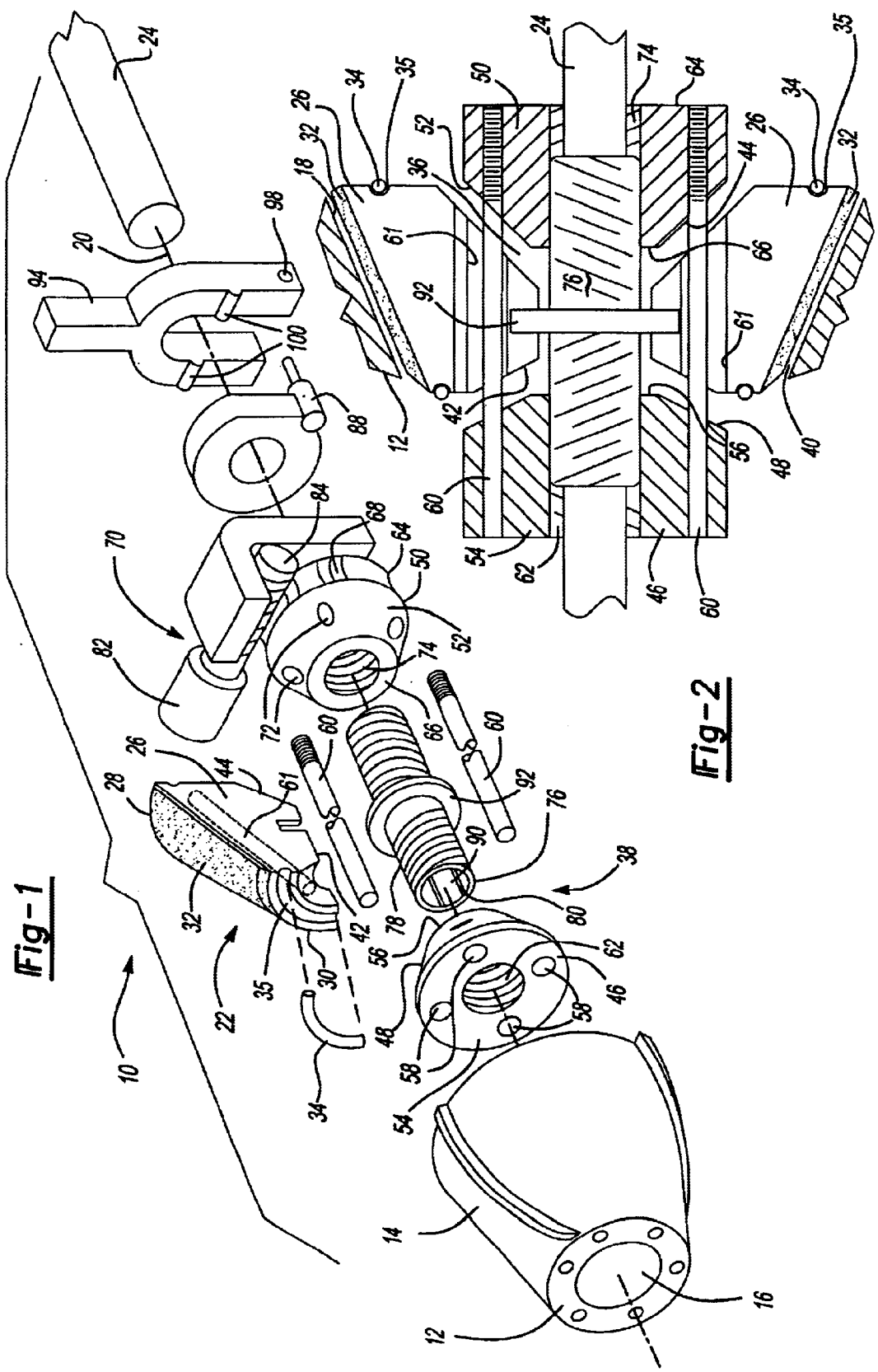

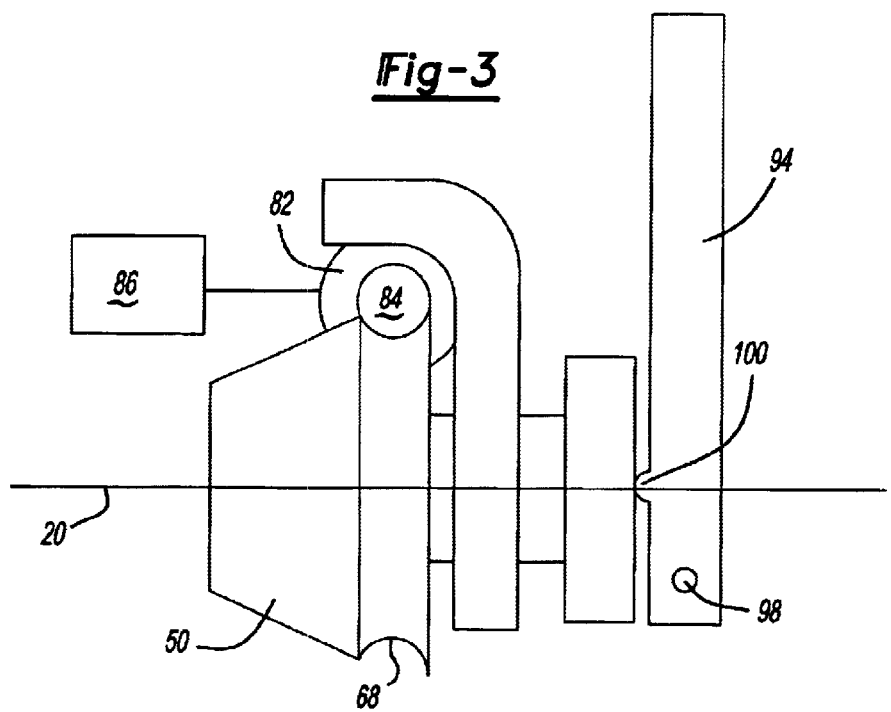
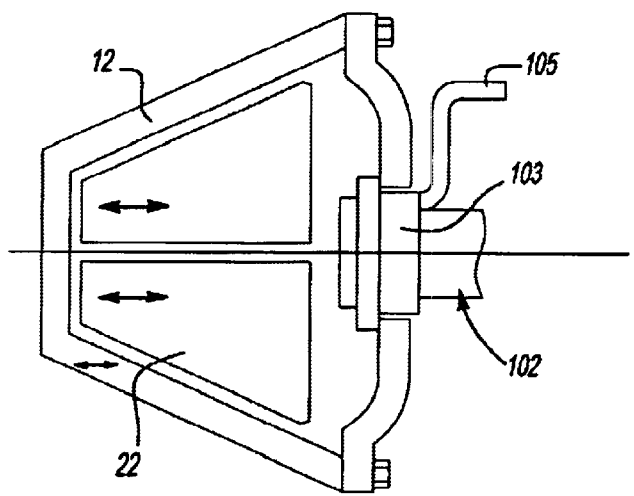
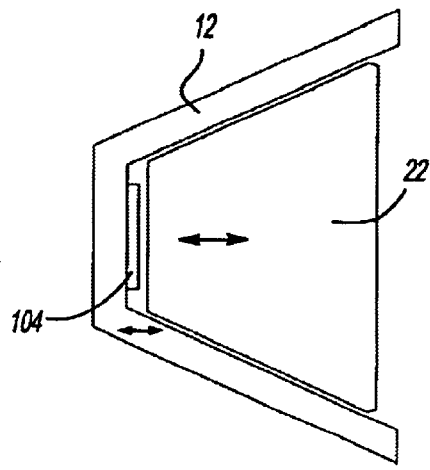

CONICAL BRAKE ASSEMBLY

BACKGROUND OF THE INVENTION

This invention relates to a conical brake assembly that permits more lining material to be packaged in a brake drum than in a conventional cylindrical brake drum assembly, while reducing actuation energy requirements Vehicle brake assemblies typically include brake linings that interact with either a brake drum to brake a vehicle. The brake linings are supported on plates and are controlled by actuators, which bring the linings into contact with the brake drum, utilizing frictional forces to stop or slow a vehicle.

These linings wear over time due to the frictional contact. For heavy duty braking applications, the linings wear out quickly and need to be replaced often. This is very expensive and results in significant vehicle down time.

Another disadvantage with brake linings is that as the linings wear, the brake becomes out of adjustment. Thus, the necessary brake pedal stroke length to actuate the brake will increase as the linings wear. To account for this, brake assemblies include slack adjusters that adjust the position of the brake linings to try to keep a constant distance between the surface of the linings and the brake drum or disc surface. These slack adjusters take up valuable packaging space and increase assembly time and cost.

Thus, it is desirable to provide a braking assembly that allows a greater amount of brake lining material to be packaged within the drum while and which utilizes an adjuster that overcomes the above mentioned deficiencies.

SUMMARY OF THE INVENTION

In a disclosed embodiment of this invention, a brake assembly includes a brake drum that is mounted for rotation about an axis. The brake drum has a conical interior cavity that defines a braking surface. A conical brake lining assembly mounted to a non-rotating axle component and presents a friction surface. A brake actuator moves the friction surface into engagement with the braking surface to brake a vehicle.

In a preferred embodiment, the brake assembly includes an adjuster mechanism that maintains a predetermined distance between the brake drum and lining assembly. The adjuster includes a first member having a threaded inner bore and a conical exterior surface. The adjuster also includes a second member having a threaded inner bore and a conical exterior surface. The first and second members are mounted on a common shaft having a threaded exterior surface. One of the threaded bores has a right handed thread and the other threaded bore has a left handed thread. The right and left handed threads engage the threaded exterior surface of the shaft to selectively draw the first and second members together linearly along the shaft to force the brake linings outwardly to maintain the predetermined distance.

This configuration allows more brake lining material to be packaged within the drum and provides a more efficient brake assembly.

These and other features of the present invention can be best understood from the following specification and drawings, the following of which is a brief description.

BRIEF DESCRIPTION OF THE DRAWINGS

FIG. 1 is an exploded view of the brake assembly incorporating the subject invention.

FIG. 2 is a cross-sectional view of the brake shoe assembly and adjustment mechanism, partially broken away.

FIG. 3 is a schematic view of one actuation method.

FIG. 4 is an alternate embodiment of an actuation method.

FIG. 5 is an alternate embodiment of an actuation method.

DETAILED DESCRIPTION OF A PREFERRED EMBODIMENT

A unique braking mechanism is shown at 10 in FIG. 1. The braking mechanism includes a conical brake drum 12 having an outer surface 14 and a frustro-conical inner cavity 16 defining a braking surface 18. The drum 12 rotates about an axis 20 with an axle wheel assembly (not shown). A brake shoe assembly, shown generally at 22, is supported by a shaft 24 and is moved linearly into the cavity 16 to brake a vehicle.

The brake shoe assembly 22 includes a brake lining 26 that is conical in shape, i.e., the brake lining 26 is of decreasing diameter from one end 28 to an opposite end 30. The brake lining 26 has an outer friction surface 32 that engages the braking surface 18 of the drum 12 to brake the vehicle. The brake lining 26 is preferably made up of four (4) brake lining block segments (only one is shown in FIG. 1) that are held together to a non-rotating wheel component with at least one resilient retainer 34. While four (4) block segments are preferred, fewer or more blocks can be utilized. Preferably, the four (4) segments are equal sections, with shoe webbing incorporating a tapered section on either end to allow for adjustment. Clearance slots are also incorporated into the web to allow for clearance of the torque rods, which are used to prevent shoe rotation during braking actuation. When a braking force is applied, the linings 26 are moved linearly into the drum 12 such that the friction surface 32 engages the braking surface 18.

An interior cavity 36, see FIG. 2, is formed within the block segments when assembled. An adjustment mechanism 38 is mounted within the cavity 36, which adjusts the block segments outwardly to maintain a predetermined distance shown at 40 between the friction surface 32 of the brake lining 26 and the braking surface 18 on the drum 12. The pedal feel for a vehicle operator remains generally constant if this predetermined distance is maintained. The interior cavity 36 has a first sloped or tapered section 42 at one end and a second sloped or tapered section 44 at an opposite end. The tapered sections 42, 44 extend in opposite directions such that the cavity is widest at the ends and narrowest at the center.

The adjustment mechanism 38 includes a first adjuster member 46 having a first mating tapered surface 48 for engaging the first tapered section 42 of the lining interior cavity 36. A second adjuster member 50 has a second mating tapered surface 52 for engaging the second tapered section 44 of the lining interior cavity 36. The adjusters 46, 50 are preferably made from a hardened steel.

The first adjuster member 46 includes a circular base 54, which extends to a distal end 56 of smaller diameter via the first mating tapered surface 48. On one side of the base 54, a plurality of holes 58 are formed to receive connecting shafts or torque rods 60, which will be discussed in more detail below. Each of the holes 58 preferably include a bushing (not shown) to allow free linear movement relative to the first adjuster member 46. The first adjuster member 46 also includes a first threaded bore 62 that extends through the center of the first adjuster member 46 from the base 54 to the distal end 56.

The second adjuster member 50 includes a circular base 64, which extends to a distal end 66 of smaller diameter via the second mating tapered surface 52. Around the periphery of the base 64, a plurality gear teeth 68 are formed which mesh with an adjuster actuator 70, which will be discussed in more detail below. A plurality of holes 72 are formed within the second mating tapered surface 52 to receive the torque rods 60. The rods 60 are preferably threaded into the holes 72 of the second adjuster member 50. Slots 61 are formed within the brake lining 26 in each block segment to receive the torque rods 60.

The torque rods 60 allow adjuster synchronization to occur between the first 46 and second 50 adjuster members. The rods 60 connect the adjuster members 46, 50 together to allow for equal rotational adjustment for each adjuster member 46, 50. The second adjuster member 50 also includes a second threaded bore 74 that extends through the center of the second adjuster member 50 from the base 64 to the distal end 66.

The first 46 and second 50 adjuster members are supported on a common cylindrical shaft 76 that has a threaded outer surface 78 and an interior bore 80. One of the threaded bores 62, 74 of the adjuster members 46, 50 has a left hand thread while the other threaded bore 62, 74 has a right hand thread. The threaded outer surface 78 of the cylindrical shaft 76 similarly has a first portion that is a left hand thread and a second portion that has a right hand thread. The right hand adjuster, i.e. the second adjuster member 50, should be slightly longer than the left handed adjuster to accommodate the adjusting mechanism. The longer right handed adjuster member 50 incorporates cone worm gearing on the outer diameter of the base portion 64, to allow for brake adjustment and to restrict shoe rotation.

The adjuster actuator 70 controls the adjustment mechanism 38. An electric motor 82 drives a cone worm gear 84 that meshes the cone worm gearing 68 on the second adjuster member 50. The worm gear 84 rides on ball bearings and is preferably case hardened for extended wear and to resist stress fatigue. The worm gear 84 is caged in a forged housing to prevent rotation of the brake lining assembly 26 during actuation. Worm gear rotation is accomplished by the electric motor 82, which is controlled by a central processor unit or other similar controller 86 (see FIG. 3) known in the art.

A linear translation sensor 88 gauges lining wear by measuring linear displacement during actuation. After a predetermined linear displacement value is sensed, the processor unit 86 actuates the worm gear electric motor 82 for lining adjustment. As the second adjuster member 50 rotates, the two adjuster members 46, 50 are pulled towards each other using the opposing threads. This forces the brake linings 26 outwardly to maintain the predetermined distance 40 between the friction surface 32 and the braking surface 18.

The brake shoe assembly 22 and adjustment mechanism 38 are supported on a common shaft 24. This shaft 24 is received within the central bore 80 of the cylindrical shaft 76 that supports the adjuster members 46, 50. The center journal shaft 76 is supported with linear bearings 90 to prevent rotation and allow linear translation of the brake shoe 22 and adjustment mechanism 38 during actuation. The journal shaft 76 rides on a modified axle end that is to be used as an inner bearing race. A left and right hand thread will be incorporated on the journal sleeve to allow for adjuster cone 46, 50 adjustment. Also incorporated in the center of the journal is an alignment ring 92 to keep proper shoe geometry.

During a braking interval or brake actuation, the whole mechanism, the shoe assembly 22 and the adjustment mechanism 38 slide on the shaft 24 to engage the friction surface 32 against the braking surface 18 of the drum 22.

Various types of brake actuators can be used to actuate the brake assembly during a braking interval. One embodiment, shown in FIG. 3, utilizes a lever 94 that incorporates a fulcrum point 98 below the axle centerline 20. Two (2) wear pads 100 are formed on the lever 94 at the axle centerline 20 for brake actuation. The center of the lever end accommodates a shaft for actuation input force.

A second actuation method, shown schematically in FIG. 4, incorporates a screw threading engagement style actuator, shown generally at 102. This system requires that the drum 12 have two (2) degrees of freedom (rotational and linear translation) and the brake shoes 22 have one degree of freedom (linear translation). The system actuates the brake by pulling the drum 12 onto the shoes 22, as well as pushing the shoes 22 into the drum 12. With this type of actuator nearly 100 percent efficiency can be achieved.

A third method of actuation, shown in FIG. 5, can utilize the same principle as the second actuation method, except that an electromagnet 104 is used to engage the drum 12 and the brake shoe assembly 22 together.

This braking mechanism 10 is preferably used with on-highway heavy vehicles where air brakes are commonly utilized. This braking mechanism uses a conical design that enables more lining material to be packaged in the brake drum 12 than in conventional brakes, while reducing actuation energy requirements. The addition of extra lining material lengthens time between servicing intervals to reduce maintenance costs for fleets. The conical brake drum 12 and corresponding lining 26 allows for a possible 5:1 mechanical advantage, which equates to lower brake input actuation forces while still achieving the performance of a conventional S-cam brake. Brake actuation is carried out by linear translation of the brake shoe 22 and adjustment assembly 38 into the brake drum 12. Brake shoe assembly 22 movement is controlled with the use of linear bearings 90, which allow horizontal movement and restrict rotational movement of the shoe assembly 22 during braking.

The braking mechanism 10 operates in the following manner. The brake shoes assemblies 22 are comprised of four sections that can expand outward to compensate for lining wear and incorporate retaining springs 34 set in a circumferential groove 35 to keep the package together. Preferably, a single circumferential spring 34 is mounted within the groove 35 around the ends of the sections to retain the four sections together, however, other similar springs known in the art can also be used. The spring 34 is pinned to each section. Preferably, the groove 35 is Teflon®coated to form a slidable surface.

Lining adjustment is accomplished with the use of two conical adjusters 46, 50 that move inwards toward each other to expand the brake shoes 22. Adjuster movement is accomplished by rotation of a worm gear 84, which in turn rotates and adjusts the conical adjusters 46, 50 with the use of left and right hand threads on a common shaft 76. Adjuster synchronization is accomplished with the four (4) horizontal rods 60 connecting the adjusters 46, 50 together, which allows for equal rotational adjustment for each adjuster. The connecting shafts 60 are threaded into the primary adjuster and are allowed free linear movement in the secondary adjuster to allow for adjustment.

Brake actuation is accomplished with the use of a simple lever 94 that translates the lining assembly 26 into the drum 12 to provide a braking force. A center ring 92 on the journal shaft 76 is used to control shoe geometry linearly to prevent misalignment during actuation. The benefits of the new arrangement include the ability to increase lining material for extended brake life before servicing, as well as reducing brake actuation forces.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. A vehicle brake assembly comprising:
    a brake drum mounted for rotation about an axis and defining a frustro-conical interior cavity having a braking surface;
    a frustro-conical brake lining mounted to a non-rotating axle component and presenting a friction surface wherein said brake lining is comprised of a plurality of lining blocks supported on a common shaft and all held together with at least one resilient retainer; and
    an actuator for moving said friction surface into engagement with said braking surface to brake a vehicle.

2. A vehicle brake assembly comprising:
    a brake drum mounted for rotation about an axis and defining a frustro-conical interior cavity having a braking surface;
    a frustro-conical brake lining mounted to a non-rotating axle component and presenting a friction surface; and
    an actuator for moving said friction surface into engagement with said braking surface to brake a vehicle wherein said actuator is a lever having a fulcrum point on one side of said axis, a force input point on an opposite side of said axis, and at least one wear pad formed on said lever at said axis for actuating said brake lining in response to a brake input force.

3. A vehicle brake assembly comprising:
    a brake drum mounted for rotation about an axis and defining a frustro-conical interior cavity having a braking surface;
    a frustro-conical brake lining mounted to a non-rotating axle component and presenting a friction surface;
    an actuator for moving said friction surface into engagement with said braking surface to brake a vehicle; and
    an adjustment mechanism for automatically maintaining a predetermined distance between said braking surface and said friction surface during non-braking intervals wherein said adjustment mechanism includes at least a first adjuster member having a first surface for engaging said brake lining to move said brake lining outwardly in a radial direction relative to said axis.

4. An assembly as recited in claim 3 wherein said first surface comprises a first adjuster tapered surface for engaging a corresponding first brake lining tapered surface on said brake lining.

5. An assembly as recited in claim 4 including a second adjuster member having a second adjuster tapered surface for engaging a corresponding second brake lining tapered surface on said brake lining.

6. An assembly as recited in claim 5 wherein said brake lining includes an interior cavity that forms both said first and second brake lining tapered surfaces.

7. An assembly as recited in claim 6 wherein said first and second brake lining tapered surfaces are non-parallel.

8. An assembly as recited in claim 7 wherein said brake lining comprises a plurality of brake lining blocks held together by a resilient retainer.

9. An assembly as recited in claim 8 wherein all of said brake lining blocks are supported on a common shaft that is coaxial with said axis.

10. An assembly as recited in claim 5 including at least one torque rod cooperating with said first and second adjuster members for synchronizing adjustment movement between said first and second adjuster members.

11. An assembly as recited in claim 10 wherein said torque rod extends through coaxial openings formed within said brake lining and said first and second adjuster members.

12. An assembly as recited in claim 3 wherein said adjustment mechanism automatically adjusts said brake lining in response to a command from a central processor unit.

13. A vehicle brake assembly comprising:
    a brake drum mounted for rotation about an axis and defining a frustro-conical interior cavity having a braking surface;
    a frustro-conical brake lining mounted to a non-rotating axle component and presenting a fiction surface;
    an actuator for moving said friction surface into engagement with said braking surface to brake a vehicle; and
    an adjuster mechanism for maintaining a predetermined distance between said braking surface and said friction surface during non-braking intervals wherein said adjuster mechanism includes a first member defining a first threaded inner bore and a first conical surface portion and a second member defining a second threaded inner bore and a second conical surface portion, said first and second members being mounted on a common shaft having a threaded exterior surface.

14. An assembly as recited in claim 13 wherein said first threaded bore has a right handed thread and said second threaded bore has a left handed thread, said right and left handed threads for engaging said threaded exterior surface of said shaft wherein an adjustor actuator selectively draws said first and second members together linearly along said shaft to force said brake lining outwardly to maintain said predetermined distance.

15. An assembly as recited in claim 14 wherein said brake lining defines an interior cavity having a first surface portion corresponding in shape to said first conical surface portion and a second surface portion corresponding in shape to said second conical portion wherein said adjustor actuator forces said first and second conical surface portions into engagement with said first and second surface portions to adjust the position of said brake lining relative to said axis.

16. An assembly as recited in claim 15 including a plurality of rods for interconnecting said first and second members, said adjustor actuator including a motor and gear assembly for rotating one of said members about said axis resulting in linear movement of said first and second members.

17. A vehicle brake assembly comprising:
    a brake drum mounted for rotation about an axis and defining a conical interior cavity having a braking surface;
    a brake lining mounted to a non-rotating axle component partially within said cavity and having a conical outer friction surface and an inner surface;
    an adjuster mechanism has at least one member in selective sliding engagement with said inner surface of said brake lining to maintain a predetermined distance between said braking and friction surfaces during non-braking intervals; and a brake actuator for moving said friction surface into engagement with said braking surface during a braking interval.

18. An assembly as recited in claim 17 wherein said brake lining is comprised of a plurality of brake blocks held together with a retainer.

19. An assembly as recited in claim 18 wherein said adjuster mechanism and said brake lining are mounted on a common shaft extending along said axis, said actuator applying a braking force resulting in linear movement of said brake lining along said shaft during said braking interval.

20. An assembly as recited in claim 18 wherein said at least one member is comprised of a first member having a first threaded inner bore and a first conical exterior surface and a second member having a second threaded inner bore and a second conical exterior surface, said first and second exterior surfaces being in sliding engagement with said interior surface of said brake lining to adjust said friction surface in a radial direction relative to said axis.

21. An assembly as recited in claim 20 wherein one of said first or second members includes a circular base at one end with a plurality of gear teeth formed about the circumference of said base and wherein said adjuster mechanism includes a motor operably connected to a worm gear in meshing engagement with said gear teeth, said motor selectively rotating said first member or second member about said axis resulting in linear movement of said first and second members along said axis.

22. A vehicle brake assembly comprising:
a brake drum mounted for rotation about an axis and defining a frustro-conical interior cavity having a braking surface;

a frustro-conical brake lining mounted to a non-rotating axle component and presenting a friction surface;

an actuator for moving said friction surface into engagement with said braking surface to brake a vehicle;

an adjuster mechanism for automatically maintaining a predetermined distance between said braking surface and said friction surface during non-braking intervals; and at least one adjuster member having a tapered surface for selectively engaging said brake lining wherein said adjuster member is coaxial with said brake drum.

23. A vehicle brake assembly comprising:
a brake drum mounted for rotation about an axis and defining a frustro-conical interior cavity having a braking surface;

a frustro-conical brake lining mounted to a non-rotating axle component presenting a friction surface;

a sensor for measuring brake lining wear;

an actuator for moving said friction surface into engagement with said braking surface to brake a vehicle;

an adjuster mechanism for automatically maintaining a predetermined distance between said braking surface and said friction surface during non-braking intervals; and an adjuster actuator for selectively adjusting a position of said brake lining relative to said brake drum brake when said brake lining wears to a predetermined level wherein said adjuster actuator comprises a gear assembly in driving engagement with said adjuster member and driven by an electric motor.

24. A vehicle brake assembly comprising:
a brake drum mounted for rotation about a central axis and defining a conical interior cavity having a braking surface;

a brake lining mounted to a non-rotating shaft partially within said cavity and having a conical outer friction surface and an inner surface;

an adjuster mechanism mounted to said non-rotating shaft for automatically maintaining a predetermined distance between said braking and friction surfaces; and a brake actuator for moving said brake lining and said non-rotating shaft in a linear direction along said central axis to place said friction surface into engagement with said braking surface during a braking interval.

25. An assembly as recited in claim 24 including an adjuster actuator for selectively actuating said adjuster mechanism in response to brake lining wear wherein said adjuster actuator operates independently from said brake actuator.

26. An assembly as recited in claim 25 including a sensor for measuring brake lining swear and communicating with a central processor unit that controls said adjuster actuator.

27. An assembly as recited in claim 26 said adjuster actuator comprises a gear assembly driven by an electric motor and in direct driving engagement with said adjuster mechanism.

28. An assembly as recited in claim herein said brake actuator comprises a pivoting lever.

29. An assembly as recited in claim 24 wherein said adjuster mechanism includes a tapered surface for engaging said brake lining for movement in a radial direction relative to said central axis.

30. An assembly as recited in claim 29 wherein said adjuster mechanism includes a first member having a first tapered surface for engaging said brake lining and a second member having a second tapered surface for engaging said brake lining.

31. An assembly as recited in claim 30 wherein said inner surface of said brake lining has a first lining tapered surface for engaging said first tapered surface of said first member and a second lining tapered surface for engaging said second tapered surface of said second member wherein said first and second lining tapered surfaces are non-parallel.

32. An assembly as recited in claim 30 wherein said first member includes a first threaded connection to said non-rotating shaft and said second member includes a second threaded connection to said non-rotating shaft with said first and second threaded connections being oppositely threaded from each other.

33. An assembly as recited in claim 32 wherein said brake lining comprises a plurality of brake lining blocks held together by a resilient retainer.

34. An assembly as recited in claim 33 including an alignment ring mounted to said non-rotating shaft between said first and second threaded connections wherein said alignment ring cooperates with each of said brake lining blocks to maintain a desired shoe geometry.

35. An assembly as recited in claim 33 including at least one torque rod cooperating with said first and second members for synchronizing adjustment movement between said first and second members.

36. An assembly as recited in claim 35 wherein said torque rod is threadably attached to only one of said first or second members.

37. An assembly as recited in claim 33 wherein each of said brake lining blocks includes a groove formed within an end face of said block and wherein said resilient retainer is mounted within said groove.

* * * * *

UNITED STATES PATENT AND TRADEMARK OFFICE
CERTIFICATE OF CORRECTION

PATENT NO.     : 6,619,441 B2                                                              Page 1 of 1
DATED          : September 16, 2003
INVENTOR(S)    : Steven Baldwin It is certified that error appears in the above-identified patent and that said Letters Patent is hereby corrected as shown below:

<u>Column 8,</u>
Line 21, "swear" should be -- wear --
Line 23, insert -- wherein -- between "claim 26" and "said adjuster"
Line 27, insert -- 25 -- after "recited in claim"
Line 27, "herein" should be -- wherein --

Signed and Sealed this

Sixth Day of January, 2004

JAMES E. ROGAN
*Director of the United States Patent and Trademark Office*